United States Patent
Rensing et al.

(10) Patent No.: US 10,612,954 B2
(45) Date of Patent: Apr. 7, 2020

(54) VIBRATORY FLOWMETER AND METHOD FOR METER VERIFICATION

(71) Applicant: Micro Motion, Inc., Boulder, CO (US)

(72) Inventors: Matthew Joseph Rensing, Cincinnati, OH (US); Christopher George Larsen, Cincinnati, OH (US); Timothy J Cunningham, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 521 days.

(21) Appl. No.: 14/890,668

(22) PCT Filed: May 20, 2014

(86) PCT No.: PCT/US2014/038728
§ 371 (c)(1),
(2) Date: Nov. 12, 2015

(87) PCT Pub. No.: WO2014/200672
PCT Pub. Date: Dec. 18, 2014

(65) Prior Publication Data
US 2016/0116319 A1    Apr. 28, 2016

Related U.S. Application Data

(60) Provisional application No. 61/842,105, filed on Jul. 2, 2013, provisional application No. 61/835,159, filed on Jun. 14, 2013.

(51) Int. Cl.
*G01F 1/84*    (2006.01)
(52) U.S. Cl.
CPC .......... *G01F 1/8477* (2013.01); *G01F 1/8436* (2013.01)
(58) Field of Classification Search
None
See application file for complete search history.

(56) References Cited

U.S. PATENT DOCUMENTS

| | | |
|---|---|---|
| 4,866,423 A | 9/1989 | Anderson et al. |
| 5,144,266 A | 9/1992 | Dougherty et al. |
| (Continued) | | |

FOREIGN PATENT DOCUMENTS

| | | |
|---|---|---|
| KR | 1020010072277 A | 7/2001 |
| WO | 9602812 A1 | 2/1996 |
| (Continued) | | |

OTHER PUBLICATIONS

Peter Enoksson, A Silicon Resonant Sensor Structure for Coriolis Mass-Flow Measurements, Journal of Microelectromechanical Systems, vol. 6, No. 2, Jun. 1997, p. 119-125.*

(Continued)

*Primary Examiner* — Tung S Lau
(74) *Attorney, Agent, or Firm* — The Ollila Law Group LLC

(57) ABSTRACT

A vibratory flowmeter (5) for meter verification is provided, including meter electronics (20) configured to vibrate the flowmeter assembly (10) in a primary vibration mode using the first and second drivers (180L, 180R), determine first and second primary mode currents (230) of the first and second drivers (180L, 180R) for the primary vibration mode and determining first and second primary mode response voltages (231) generated by the first and second pickoff sensors (170L, 170R) for the primary vibration mode, generate a meter stiffness value (216) using the first and second primary mode currents (230) and the first and second primary mode response voltages (231), and verify proper operation of the vibratory flowmeter (5) using the meter stiffness value (216).

9 Claims, 7 Drawing Sheets

(56) References Cited

U.S. PATENT DOCUMENTS

| | | | |
|---|---|---|---|
| 5,184,518 A | 2/1993 | Lew | |
| 5,373,745 A * | 12/1994 | Cage | G01F 1/8409 73/861.18 |
| 5,455,778 A * | 10/1995 | Ide | F01D 25/164 700/182 |
| 5,663,509 A * | 9/1997 | Lew | G01F 1/8413 73/861.355 |
| 5,969,265 A * | 10/1999 | VanCleve | G01F 1/8413 73/861.355 |
| 6,233,526 B1 | 5/2001 | Cunningham | |
| 6,249,752 B1 | 6/2001 | Cunningham et al. | |
| 6,272,438 B1 | 8/2001 | Cunningham et al. | |
| 6,360,175 B1 | 3/2002 | Cunningham et al. | |
| 6,427,127 B1 | 7/2002 | Cunningham | |
| 6,651,011 B1 * | 11/2003 | Bache | E04C 3/22 702/33 |
| 6,678,624 B2 | 1/2004 | Normen | |
| 7,441,469 B2 | 10/2008 | Shelley et al. | |
| 7,706,987 B2 | 4/2010 | Sharp et al. | |
| 7,716,995 B2 | 5/2010 | Patten et al. | |
| 7,831,400 B2 | 11/2010 | Stack et al. | |
| 7,904,268 B2 * | 3/2011 | Wheeler | G01F 1/8413 702/100 |
| 7,979,230 B2 * | 7/2011 | Dutton | G01F 1/8436 702/100 |
| 9,658,097 B2 * | 5/2017 | Berndt | G01F 25/0007 |
| 2003/0191598 A1 * | 10/2003 | Normen | G01F 1/8413 702/100 |
| 2007/0017274 A1 * | 1/2007 | Wheeler | G01F 1/8413 73/1.16 |
| 2008/0184813 A1 * | 8/2008 | Patten | G01F 1/8413 73/861.355 |
| 2008/0286680 A1 * | 11/2008 | Norikane | B01J 2/04 430/110.4 |
| 2009/0249891 A1 * | 10/2009 | Van Cleve | G01F 1/8409 73/861.357 |
| 2012/0255370 A1 * | 10/2012 | Rieder | G01F 1/8404 73/861.357 |
| 2016/0123792 A1 * | 5/2016 | Plaziak | G01F 25/0007 73/1.16 |

FOREIGN PATENT DOCUMENTS

| | | |
|---|---|---|
| WO | 0008423 A1 | 2/2000 |
| WO | 2006031215 A1 | 3/2006 |
| WO | 2007040468 A1 | 4/2007 |
| WO | 2007040542 A1 | 4/2007 |

OTHER PUBLICATIONS

Matthew Rensing, Coriolis Flowmeter Verification via Embedded Modal Analysis, Copyright 2010, 10 pages.*
Richard Smith, A MEMS-based Coriolis Mass Flow Sensor for Industrial Applications, IEEE Transactions on Industrial Electronics, vol. 56, No. 4, Apr. 2009, 7 pages.*
Tim Cunningham, Using Structural Integrity Meter Verification to Verify Coriolis Flowmeters, 2007 Micro Motion, Inc. All rights reserved, 6 pages.*
May _ Definition of May at Dictionary.com.pdf, 1 page (Year: 2019).*
Matthew Rensing et al: "Coriolis Flowmeter Verification via Embedded Modal Analysis" In: Jan. 31, 2011 (Jan. 31, 2011), Springer New York, NY, xP055132407, ISSN: 2191-5644, ISBN: 978-1-46-140210-7 pp. 851-860, DOI: 10.1007/978-1-4419-9834-7_75, the whole document.

* cited by examiner

VIBRATORY FLOWMETER AND METHOD FOR METER VERIFICATION

TECHNICAL FIELD

The present invention relates to a vibratory flowmeter and method, and more particularly, to a vibratory flowmeter and method for meter verification.

BACKGROUND OF THE INVENTION

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing the measurement signals received from the motion transducers associated with the conduit. The vibration modes of the vibrating material-filled system generally are affected by the combined mass, stiffness and damping characteristics of the conduit and the material contained therein.

A typical dual-driver, or multiple input, multiple output (MIMO) Coriolis mass flowmeter includes one or more conduits, or flow tubes, that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical dual-driver Coriolis mass flow measurement application, a conduit is excited in one or more vibration modes as a material flows through the conduit, and motion of the conduit is measured at points spaced along the conduit. Excitation is typically provided by two actuators, e.g., electromechanical devices, such as voice coil-type drivers, that perturb the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement or a density measurement, among other things.

It is a problem that the one or more conduits may change with time, wherein an initial factory calibration may change over time as the conduits are corroded, eroded, or otherwise changed. As a consequence, the conduit stiffness may change from an initial representative stiffness value (or original measured stiffness value) over the life of the vibratory flowmeter.

Mass flow rate ($\dot{m}$) may be generated according to the equation:

$$\dot{m} = FCF^*[\Delta t - \Delta t_o] \quad (1)$$

The Flow Calibration Factor (FCF) is required to determine a mass flow rate measurement ($\dot{m}$) or a density measurement ($\rho$) of a fluid. The (FCF) term comprises a Flow Calibration Factor and typically comprises a geometric constant (G), Young's Modulus (E), and a moment of inertia (I), wherein:

$$FCF = G^*E^*I \quad (2)$$

The geometric constant (G) for the vibratory flowmeter is fixed and does not change. The Young's Modulus constant (E) likewise does not change. By contrast, the moment of inertia (I) may change. One way to track the changes in moment of inertia and FCF of a vibratory flowmeter is by monitoring the stiffness and residual flexibility of the flowmeter conduits. There are increasing demands for ever better ways to track changes in the FCF, which affect the fundamental performance of a vibratory flowmeter.

What is needed is a technique to track the FCF in a dual-driver flowmeter to verify the performance of the flowmeter with improved precision.

SUMMARY OF THE INVENTION

A vibratory flowmeter for stiffness verification is provided according to an embodiment of the Application. The vibratory flowmeter for meter stiffness verification includes a flowmeter assembly including one or more flowtubes and first and second pickoff sensors; first and second drivers configured to vibrate the one or more flowtubes; and meter electronics coupled to the first and second pickoff sensors and coupled to the first and second drivers, with the meter electronics being configured to vibrate the flowmeter assembly in a primary vibration mode using the first and second drivers, determine first and second primary mode currents of the first and second drivers for the primary vibration mode and determining first and second primary mode response voltages generated by the first and second pickoff sensors for the primary vibration mode, generate a meter stiffness value using the first and second primary mode currents and the first and second primary mode response voltages, and verify proper operation of the vibratory flowmeter using the meter stiffness value.

A method for meter verification method for a vibratory flowmeter is provided according to an embodiment of the Application. The method includes vibrating a flowmeter assembly of the vibratory flowmeter in a primary vibration mode using a first driver and at least a second driver; determining first and second primary mode currents of the first and second drivers for the primary vibration mode and determining first and second primary mode response voltages of first and second pickoff sensors for the primary vibration mode; generating a meter stiffness value using the first and second primary mode currents and the first and second primary mode response voltages; and verifying proper operation of the vibratory flowmeter using the meter stiffness value.

Aspects

Preferably, the first and second primary mode currents comprise commanded current levels.

Preferably, the first and second primary mode currents comprise measured current levels.

Preferably, the second driver is uncorrelated with the first driver.

Preferably, the meter electronics is further configured to compare the meter stiffness value to a predetermined stiffness range, generate a verification indication for the vibratory flowmeter if the meter stiffness value falls within the predetermined stiffness range, and generate a verification failure indication for the vibratory flowmeter if the meter stiffness value does not fall within the predetermined stiffness range.

Preferably, the meter electronics is further configured to vibrate the flowmeter assembly in a secondary vibration mode using the first and second drivers, determine first and second secondary mode currents of the first and second drivers for the secondary vibration mode and determine first and second secondary mode response voltages of the first and second pickoff sensors for the secondary vibration mode, and generate the meter stiffness value using one or both of the first and second primary mode currents and the first and second primary mode response voltages or the first and second secondary mode currents and the first and second secondary mode response voltages.

Preferably, the meter electronics is further configured to generate a meter residual flexibility value using the first and second primary mode currents and the first and second primary mode response voltages.

Preferably, the meter electronics is further configured to generate a meter residual flexibility value using the first and second primary mode currents and the first and second primary mode response voltages, compare the meter residual flexibility value to a predetermined residual flexibility range, and generate a verification indication for the vibratory flowmeter if the meter residual flexibility value falls within the predetermined residual flexibility range, and generate a verification failure indication for the vibratory flowmeter if the meter residual flexibility value does not fall within the predetermined residual flexibility range.

Preferably, the meter electronics is further configured to vibrate the flowmeter assembly in a secondary vibration mode using the first and second drivers, determine first and second secondary mode currents of the first and second drivers for the secondary vibration mode and determining first and second secondary mode response voltages of the first and second pickoff sensors for the secondary vibration mode, and generate a meter residual flexibility value using one or both of the first and second primary mode currents and the first and second primary mode response voltages or the first and second secondary mode currents and the first and second secondary mode response voltages.

Preferably, the first driver current and the second driver current comprise commanded current levels.

Preferably, the first driver current and the second driver current comprise measured current levels.

Preferably, the first response voltage and the second response voltage comprise substantially maximum response voltages quantified by the first and second pickoff sensors.

Preferably, the second driver is uncorrelated with the first driver.

Preferably, verifying proper operation of the vibratory flowmeter comprises comparing the meter stiffness value to a predetermined stiffness range, generating a verification indication for the vibratory flowmeter if the meter stiffness value falls within the predetermined stiffness range, and generating a verification failure indication for the vibratory flowmeter if the meter stiffness value does not fall within the predetermined stiffness range.

Preferably, further comprising vibrating the flowmeter assembly in a secondary vibration mode using the first driver and at least the second driver, determining first and second secondary mode currents of the first and second drivers for the secondary vibration mode and determining first and second secondary mode response voltages of first and second pickoff sensors for the secondary vibration mode, and generating the meter stiffness value using one or both of the first and second primary mode currents and the first and second primary mode response voltages or the first and second secondary mode currents and the first and second secondary mode response voltages.

Preferably, further comprising generating a meter residual flexibility value using the first and second primary mode currents and the first and second primary mode response voltages.

Preferably, further comprising generating a meter residual flexibility value using the first and second primary mode currents and the first and second primary mode response voltages, comparing the meter residual flexibility value to a predetermined residual flexibility range, generating a verification indication for the vibratory flowmeter if the meter residual flexibility value falls within the predetermined residual flexibility range, and generating a verification failure indication for the vibratory flowmeter if the meter residual flexibility value does not fall within the predetermined residual flexibility range.

Preferably, further comprising vibrating the flowmeter assembly in a secondary vibration mode using the first driver and at least the second driver, determining first and second secondary mode currents of the first and second drivers for the secondary vibration mode and determining first and second secondary mode response voltages of first and second pickoff sensors for the secondary vibration mode, and generating a meter residual flexibility value using one or both of the first and second primary mode currents and the first and second primary mode response voltages or the first and second secondary mode currents and the first and second secondary mode response voltages.

BRIEF DESCRIPTION OF THE DRAWINGS

The same reference number represents the same element on all drawings. The drawings are not necessarily to scale.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
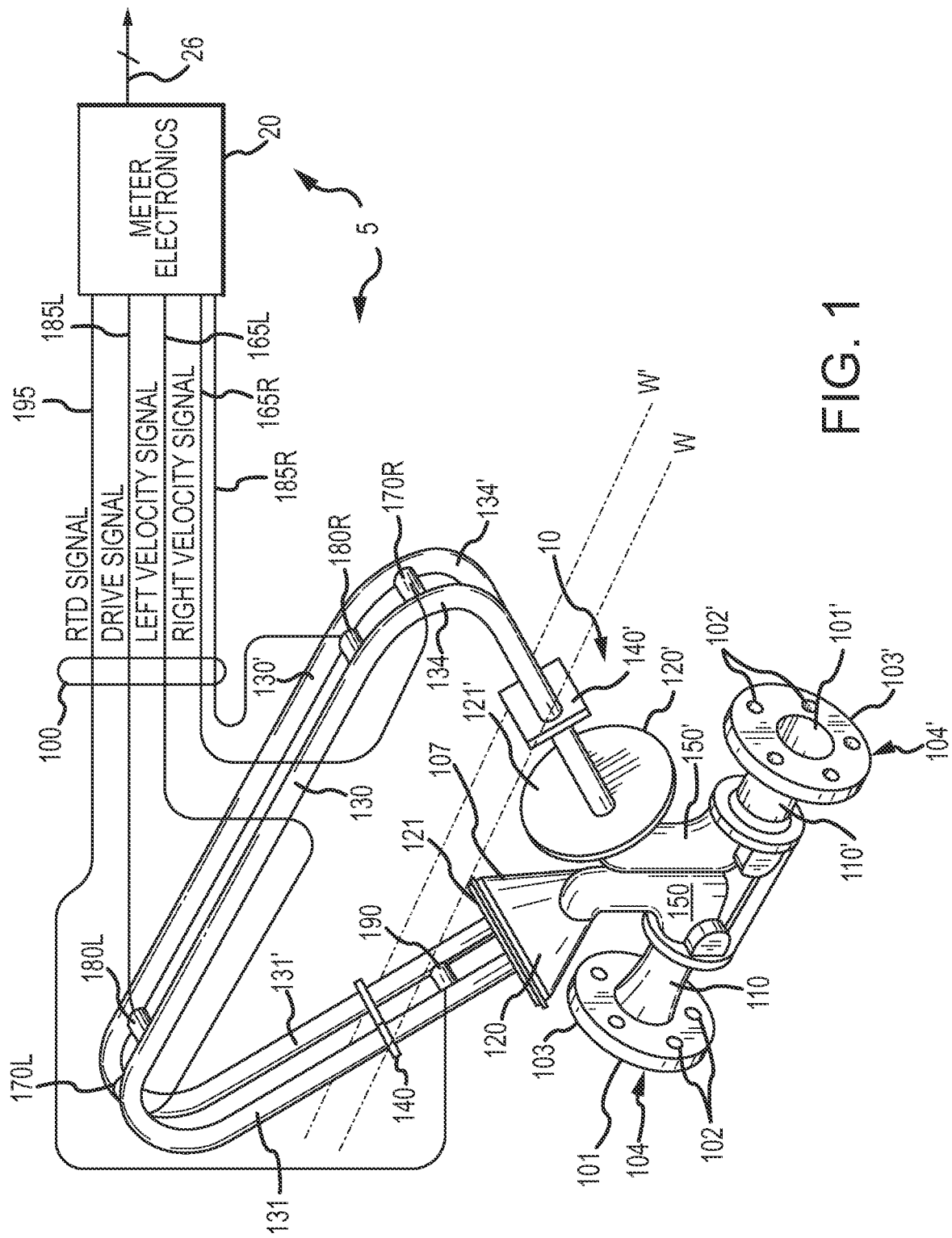
FIG. 1 shows a vibratory flowmeter for meter verification according to an embodiment of the invention.

FIG. 1 shows a vibratory flowmeter 5 for meter verification according to an embodiment of the invention. The flowmeter 5 comprises a flowmeter assembly 10 and meter electronics 20 coupled to the flowmeter assembly 10. The flowmeter assembly 10 responds to mass flow rate and density of a process material. The meter electronics 20 is connected to the flowmeter assembly 10 via the leads 100 to provide density, mass flow rate, and temperature information over a communication link 26, as well as other information. A Coriolis flowmeter structure is described although it is apparent to those skilled in the art that the present invention could also be operated as a vibrating tube densitometer.

The flowmeter assembly 10 includes manifolds 150 and 150', flanges 103 and 103' having flange necks 110 and 110', parallel flowtubes 130 and 130', first and second drivers 180L and 180R, and first and second pickoff sensors 170L and 170R. The first and second drivers 180L and 180R are spaced apart on the one or more flowtubes 130 and 130'. In addition, in some embodiments the flowmeter assembly 10 may include a temperature sensor 190. The flowtubes 130 and 130' have two essentially straight inlet legs 131 and 131' and outlet legs 134 and 134' which converge towards each other at the flowtube mounting blocks 120 and 120'. The flowtubes 130 and 130' bend at two symmetrical locations along their length and are essentially parallel throughout their length. The brace bars 140 and 140' serve to define the axis W and the substantially parallel axis W' about which each flowtube oscillates.

The side legs 131, 131' and 134, 134' of the flowtubes 130 and 130' are fixedly attached to flowtube mounting blocks 120 and 120' and these blocks, in turn, are fixedly attached to the manifolds 150 and 150'. This provides a continuous closed material path through the flowmeter assembly 10.

When the flanges 103 and 103', having holes 102 and 102' are connected, via the inlet end 104 and the outlet end 104' into a process line (not shown) which carries the process material that is being measured, material enters the end 104 of the meter through an orifice 101 in the flange 103 and is conducted through the manifold 150 to the flowtube mounting block 120 having a surface 121. Within the manifold 150 the material is divided and routed through the flowtubes 130 and 130'. Upon exiting the flowtubes 130 and 130', the process material is recombined in a single stream within the manifold 150' and is thereafter routed to the exit end 104' connected by the flange 103' having bolt holes 102' to the process line (not shown).

The flowtubes 130 and 130' are selected and appropriately mounted to the flowtube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flowtubes change with temperature, and this change affects the calculation of flow and density, the resistive temperature detector (RTD) 190 is mounted to the flowtube 130', to continuously measure the temperature of the flowtube. The temperature dependent voltage appearing across the RTD 190 may be used by the meter electronics 20 to compensate for the change in the elastic modulus of the flowtubes 130 and 130' due to any changes in flowtube temperature. The RTD 190 is connected to the meter electronics 20 by the lead 195.

The first and second drivers 180L and 180R are spaced apart and are located at upstream and downstream portions of the flowtubes 130 and 130'. A suitable drive signal is supplied to the first and second drivers 180L and 180R by the meter electronics 20 via the leads 185L and 185R. The first and second drivers 180L and 180R may comprise any one of many well-known arrangements, such as a magnet mounted to the flowtube 130' and an opposing coil mounted to the flowtube 130 and through which an alternating current is passed for vibrating both flowtubes 130, 130'. Depending on the polarity of the drive signal applied to the coil component of the driver, a magnetic field can be generated which adds to or opposes the magnetic field of the magnet component of the driver. As a result, the polarity of the drive signal can push the coil and magnet components apart, causing the drive to expand, or can pull the coil and magnet components together, causing the driver to contract. The expansion or contraction of the driver can move the flowtubes 130 and 130' apart or together.

The flowtubes 130 and 130' may be driven by the first and second drivers 180L and 180R in any desired vibration mode. In a bending mode (see FIG. 4 and the accompanying discussion), the flowtubes 130 and 130' may be driven by a bending mode drive signal or signals in opposite directions about their respective bending axes W and W' in what is termed the first out-of-phase bending mode of the vibratory flowmeter 5. In a bending mode vibration, the first and second drivers 180L and 180R are driven by the drive signal or signals to operate synchronously and in phase, with the first and second drivers 180L and 180R expanding simultaneously to push the flowtubes 130 and 130' apart, and then will contract simultaneously to pull the flowtubes 130 and 130' together.

In a twist mode vibration (see FIG. 5 and the accompanying discussion), the first and second drivers 180L and 180R are driven by a twist mode drive signal to operate 180 degrees out of phase, with one driver expanding and the other driver simultaneously contracting, wherein the upstream portion of the flowtubes 130 and 130' will move apart while the downstream portion will move together at one instance in time, and then the motion is reversed. As a result, the flowtubes 130 and 130' include central nodes N and N', wherein the flowtubes 130 and 130' vibrate (i.e., twist) around the central nodes N and N'.

The meter electronics 20 receives the RTD temperature signal on the lead 195, and the left and right velocity signals appearing on the leads 165L and 165R, respectively. The meter electronics 20 produces the drive signal appearing on the leads 185L and 185R to the first and second drivers 180L and 180R and vibrates the flowtubes 130 and 130'. The meter electronics 20 processes the left and right velocity signals and the RTD signal to compute the mass flow rate and the density of the material passing through the flowmeter assembly 10. This information, along with other information, is applied by the meter electronics 20 over the communication link 26 to an external device or devices.

Flowmeters are inevitably affected by operation, by the operating environment, and by the flow material flowing through the flowmeter. As a result, the meter stiffness may change over time, such as due to erosion by the flow material, and corrosion, for example. Changes in the meter stiffness can result in erroneous flow rate measurements. Consequently, operating the vibratory flowmeter using a flow calibration factor value that was obtained at the time of manufacture may result in increasingly inaccurate measurements by the vibratory flowmeter.

Figure 2:
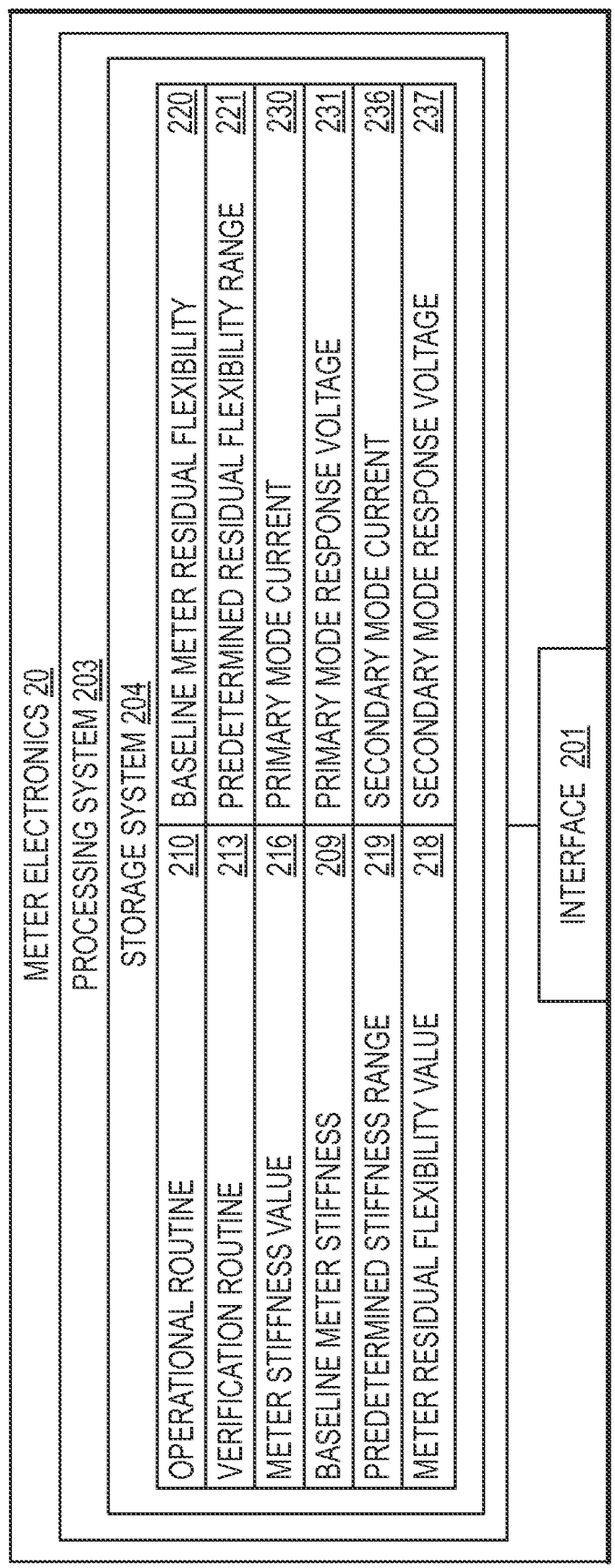
FIG. 2 shows meter electronics for meter verification of the vibratory flowmeter according to an embodiment of the invention.

FIG. 2 shows meter electronics 20 for meter verification of the vibratory flowmeter 5 according to an embodiment of the invention. The meter electronics 20 can include an interface 201 and a processing system 203. The meter electronics 20 receives and processes first and second sensor signals from the flowmeter assembly 10, such as pickoff sensor signals from the first and second pickoff sensors 170L, 170R.

The interface 201 transmits a drive signal or drive signals to the drivers 180L and 180R via the leads 165L and 165R. The interface 201 can transmit one drive signal to the two drivers 180L and 180R via the leads 165L and 165R. Alternatively, the interface 201 can transmit two separate drive signals to the drivers 180L and 180R via the leads 165L and 165R. The two separate drive signals can be the same or can differ from each other.

Alternatively, the interface 201 can transmit a drive signal or signals and a meter verification excitation signal or signals to the drivers 180L and 180R. As a result, the meter electronics 20 can inject additional signals (i.e., meter verification excitation signals) into the drivers 180L and 180R for the meter verification process. Primary mode currents and secondary mode currents can then be measured for the drivers 180L and 180R due to the meter verification excitation signals.

The interface 201 receives the first and second sensor signals from the first and second pickoff sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as via the communication link 26, for example. The interface 201 can transfer measurement data to external devices via the communication link 26 and can receive commands, updates, data, and other information from external devices. The interface 201 can be capable of any manner of electronic, optical, or wireless communication.

The interface 201 in one embodiment includes a digitizer (not shown), wherein the sensor signal comprises an analog sensor signal. The digitizer samples and digitizes the analog sensor signal and produces a digital sensor signal. The interface/digitizer can also perform any needed decimation, wherein the digital sensor signal is decimated in order to reduce the amount of signal processing needed and to reduce the processing time.

The processing system 203 conducts operations of the meter electronics 20 and processes flow measurements from the flowmeter assembly 10. The processing system 203 executes an operational routine 210 and thereby processes the flow measurements in order to produce one or more flow characteristics (or other flow measurements).

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204. The storage system 204 may be coupled to the processing system 203 or may be integrated into the processing system 203.

The storage system 204 can store information used for operating the vibratory flowmeter 5, including information generated during the operation of the vibratory flowmeter 5. The storage system 204 can store one or more signals that are used for vibrating the flowtubes 130 and 130' and that are provided to the first and second drivers 180L and 180R. In addition, the storage system 204 can store vibrational response signals generated by the first and second pickoff sensors 170L and 170R when the flowtubes 130 and 130' are vibrated.

The one or more drive signals may include drive signals for generating a primary mode vibration and a secondary mode vibration, along with the meter verification excitation signals (tones), for example. The primary mode vibration in some embodiments may comprise a bending mode vibration and the secondary mode vibration in some embodiments may comprise a twist mode vibration. However, other or additional vibration modes are contemplated and are within the scope of the description and claims.

The meter electronics 20 can control the first and second drivers 180L and 180R to operate in a correlated manner, wherein the first and second drivers 180L and 180R receive drive signals that are substantially identical in drive signal phase, drive signal frequency, and drive signal amplitude. If the first and second drivers 180L and 180R are operated in a correlated manner, then the stiffness and residual flexibility values comprise [2×1] vectors or matrices.

Alternatively, the meter electronics 20 can control the first and second drivers 180L and 180R to operate in an uncorrelated manner, wherein the first and second drivers 180L and 180R can differ during operation in one or more of drive signal phase, drive signal frequency, or drive signal amplitude. If the first and second drivers 180L and 180R are operated in an uncorrelated manner, then the stiffness and residual flexibility values comprise [2×2] vectors or matrices, generating two additional diagnostics for each of the stiffness and residual flexibility.

The storage system 204 can store a primary mode current 230. The primary mode drive current 230 may comprise a drive/excitation current or currents used to generate the primary vibration mode in the flowmeter assembly 10 as well as the meter verification signals. The primary mode drive current 230 may comprise currents from one or both of the first and second drivers 180L and 180R. In some embodiments, the storage system 204 can store first and second primary mode currents 230 corresponding to the first and second drivers 180L and 180R. The first and second primary mode currents 230 can comprise commanded currents for the primary vibration mode (i.e., the currents stipulated for the first and second drivers 180L and 180R) or can comprise measured currents of the primary vibration mode (i.e., the currents measured as actually flowing through the first and second drivers 180L and 180R).

The storage system 204 can store a secondary mode current 236. The secondary mode current 236 may comprise a drive/excitation current or currents used to generate the secondary vibration mode in the flowmeter assembly 10 as well as the meter verification signals. The secondary mode current 236 may comprise currents from one or both of the first and second drivers 180L and 180R. In some embodiments, the storage system 204 can store first and second secondary mode currents 236 corresponding to the first and second drivers 180L and 180R. The first and second secondary mode currents 236 can comprise commanded currents for the secondary vibration mode or can comprise measured currents of the secondary vibration mode.

The storage system 204 can store a primary mode response voltage 231. The primary mode response voltage 231 may comprise sinusoidal voltage signals or voltage levels generated in response to the primary vibration mode. The primary mode response voltage 231 may comprise voltage signals or voltage levels (such as peak voltages) generated by one or both of the first and second pickoff sensors 170L and 170R. The response voltages will also include the responses at the meter verification excitation signal frequencies. In some embodiments, the storage system 204 can store first and second primary mode response voltages 231 corresponding to the first and second pickoff sensors 170L and 170R.

The storage system 204 can store secondary mode response voltage 237. The secondary mode response voltage 237 may comprise sinusoidal voltage signals or voltage levels generated in response to the secondary vibration mode. The secondary mode response voltage 237 may comprise voltage signals or voltage levels (such as peak voltages) generated by one or both of the first and second pickoff sensors 170L and 170R. The response voltages will also include the responses at the meter verification excitation signal frequencies. In some embodiments, the storage system 204 can store first and second secondary mode response voltages 237 corresponding to the first and second pickoff sensors 170L and 170R.

The storage system 204 can store a meter stiffness value 216. The meter stiffness value 216 comprises a stiffness value that is determined from vibrational responses generated during operation of the vibratory flowmeter 5. The meter stiffness value 216 may be generated in order to verify proper operation of the vibratory flowmeter 5. The meter stiffness value 216 may be generated for a verification process, wherein the meter stiffness value 216 serves the purpose of verifying proper and accurate operation of the vibratory flowmeter 5.

The meter stiffness value 216 may be generated from the information or measurements generated during a primary vibration mode, during a secondary vibration mode, or both. Likewise, the residual flexibility value may be generated from the information or measurements generated during a primary vibration mode, during a secondary vibration mode, or both. If the meter stiffness value 216 is generated using information from both the primary and secondary modes, then the meter stiffness value 216 may be more accurate and reliable than if only one vibration mode is used. When both the primary and secondary vibration modes are used, then a stiffness vector or matrix can be generated for each mode. Likewise, when both the primary and secondary vibration modes are used, then a residual flexibility vector or matrix can be generated for each mode.

The vibrational response of a flowmeter can be represented by an open loop, second order drive model, comprising:

$$M\ddot{x} + C\dot{x} + Kx = f(t) \quad (3)$$

where f is the force applied to the system, M is a mass parameter of the system, C is a damping parameter, and K is a stiffness parameter. The term x is the physical displacement distance of the vibration, the term $\dot{x}$ is the velocity of the flowtube displacement, and the term $\ddot{x}$ is the acceleration. This is commonly referred to as the MCK model. This formula can be rearranged into the form:

$$(ms^2 + cs + k)X(s) = F(s) + (ms + c)x(0) + m\dot{x}(0) \quad (4)$$

Equation (4) can be further manipulated into a transfer function form, while ignoring the initial conditions. The result is:

$$H(s) = \frac{\text{output}}{\text{input}} = \frac{X(s)}{F(s)} = \frac{\frac{1}{m}}{s^2 + \frac{c}{m}s + \frac{k}{m}} \quad (5)$$

Further manipulation can transform equation (5) into a first order pole-residue frequency response function form, comprising:

$$H(\omega) = \frac{R}{(j\omega - \lambda)} + \frac{\overline{R}}{(j\omega - \overline{\lambda})} \quad (6)$$

where $\lambda$ is the pole, R is the residue, the term (j) comprises the square root of $-1$, and $\omega$ is the circular excitation frequency in radians per second.

The system parameters comprising the natural/resonant frequency ($\omega_n$), the damped natural frequency ($\omega_d$), and the decay characteristic ($\zeta$) are defined by the pole.

$$\omega_n = |\lambda| \quad (7)$$

$$\omega_d = imag(\lambda) \quad (8)$$

$$\zeta = \frac{\text{real}(\lambda)}{\omega_n} \quad (9)$$

The stiffness parameter (K), the damping parameter (C), and the mass parameter (M) of the system can be derived from the pole and residue.

$$M = \frac{1}{2jR\omega_d} \quad (10)$$

$$K = \omega_n^2 M \quad (11)$$

$$C = 2\zeta\omega_n M \quad (12)$$

Consequently, the stiffness parameter (K), the mass parameter (M), and the damping parameter (C) can be calculated based on a good estimate of the pole ($\lambda$) and the residue (R).

The pole and residue are estimated from the measured Frequency Response Functions (FRFs). The pole ($\lambda$) and the residue (R) can be estimated using an iterative computational method, for example.

The response near the drive frequency is composed of primarily the first term of equation (6), with the complex conjugate term contributing only a small, nearly constant "residual" part of the response. As a result, equation (6) can be simplified to:

$$H(\omega) = \frac{R}{(j\omega - \lambda)} \quad (13)$$

In equation (13), the H($\omega$) term is the measured FRF. In this derivation, H is composed of a displacement output divided by a force input. However, with the voice coil pickoffs typical of a Coriolis flowmeter, the measured FRF (i.e., a $\tilde{H}$ term) is in terms of velocity divided by force. Therefore, equation (13) can be transformed into the form:

$$\tilde{H}(\omega) = H(\omega) \cdot j\omega = \frac{j\omega R}{(j\omega - \lambda)} \quad (14)$$

Equation (14) can be further rearranged into a form that is easily solvable for the pole (λ) and the residue (R).

$$\tilde{H}j\omega - \tilde{H}\lambda = j\omega R = \quad (15)$$

$$\tilde{H} = R + \frac{\tilde{H}}{j\omega}\lambda \quad (16)$$

$$\begin{bmatrix} 1 & \frac{\tilde{H}}{j\omega} \end{bmatrix} \begin{Bmatrix} R \\ \lambda \end{Bmatrix} = \tilde{H} \quad (17)$$

Equations (15)-(17) form an over-determined system of equations. Equation (17) can be computationally solved in order to determine the pole (λ) and the residue (R) from the velocity/force FRF (H̃). The terms H, R, and λ are complex.

Correlated drivers can be used in the primary mode, the secondary mode, or in multiple modes. In some embodiments, the drivers are correlated and two FRFs may be measured in each of the primary and secondary modes. Consequently, four FRFs may be measured: 1) a FRF from the left driver 180L to the left pickoff 170L, 2) a FRF from the left driver 180L to the right pickoff 170R), 3) a FRF from the right driver 180R to the left pickoff 170L, and 4) a FRF from the right driver 180R to the right pickoff 170R.

Recognizing that the FRFs share a common pole (λ) but separate residues ($R_L$) and ($R_R$), the two measurements can be combined advantageously to result in a more robust pole and residue determination.

$$\begin{bmatrix} 1 & 0 & \frac{\tilde{H}_{LPO}}{j\omega} \\ 0 & 1 & \frac{\tilde{H}_{RPO}}{j\omega} \end{bmatrix} \begin{Bmatrix} R_L \\ R_R \\ \lambda \end{Bmatrix} = \tilde{H} \quad (18)$$

Equation (18) can be solved in any number of ways. In one embodiment, the equation is solved through a recursive least squares approach. In another embodiment, the equation is solved through a pseudo-inverse technique. In yet another embodiment, because all of the measurements are available simultaneously, a standard Q-R decomposition technique can be used. The Q-R decomposition technique is discussed in Modern Control Theory, William Brogan, copyright 1991, Prentice Hall, pp. 222-224, 168-172.

After equation (18) is iteratively processed to a satisfactory convergence, then the pole and residue can be used for generating stiffness values according to equations (10) and (11). With driver inputs that are correlated, Equations (10) and (11) can be used to generate stiffness values between the drivers and the left pickoff and the drivers and the right pickoff. In this case, the stiffness and residual flexibility values for each mode are of the size [2×1].

Equations (10) and (11) can also be used to generate stiffness values K between each pickoff sensor 170L and 170R and each driver 180L and 180R. Stiffness values generated can include a $K_{LL}$ (auto) stiffness value generated for the left pickoff sensor using the left driver, a $K_{RL}$ (cross) stiffness value generated for the right pickoff sensor 170R using the left driver 180L, a $K_{LR}$ (cross) stiffness value generated for the left pickoff sensor 170L using the right driver 180R, and a $K_{RR}$ (auto) stiffness value generated for the right pickoff sensor 170R using the right driver 180R. The two (auto) terms may be equal due to the symmetry of the structure. The (cross) terms will always be equal to each other due to reciprocity, i.e., inputting a vibration at point A and measuring the response at point B will generate the same vibrational response result as inputting the vibration at point B and measuring the response at point A. The result is a stiffness matrix X:

$$X = \begin{bmatrix} K_{RR} & K_{LR} \\ K_{RL} & K_{RR} \end{bmatrix} \quad (19)$$

The stiffness matrix X can be stored as the meter stiffness value 216.

The storage system 204 can store a baseline meter stiffness 209 that is programmed into the meter electronics 20. In some embodiments, the baseline meter stiffness 209 may be programmed into the meter electronics 20 at the factory (or other manufacturer facility), such as upon construction or sale of the vibratory flowmeter 5. Alternatively, the baseline meter stiffness 209 may be programmed into the meter electronics 20 during a field calibration operation or other calibration or re-calibration operation. However, it should be understood that the baseline meter stiffness 209 in most embodiments will not be changeable by a user or operator or during field operation of the vibratory flowmeter 5.

If the meter stiffness value 216 is substantially the same as the baseline meter stiffness 209, then it can be determined that the vibratory flowmeter 5 is relatively unchanged in condition from when it was manufactured, calibrated, or when the vibratory flowmeter 5 was last re-calibrated. Alternatively, where the meter stiffness value 216 significantly differs from the baseline meter stiffness 209, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

The storage system 204 can store a predetermined stiffness range 219. The predetermined stiffness range 219 comprises a selected range of acceptable stiffness values. The predetermined stiffness range 219 may be chosen to account for normal wear on the vibratory flowmeter 5. The predetermined stiffness range 219 may be chosen to account for corrosion or erosion in the vibratory flowmeter 5.

In one embodiment, the storage system 204 stores a meter residual flexibility value 218. The meter residual flexibility value 218 comprises a residual flexibility value that is determined from vibrational responses generated during operation of the vibratory flowmeter 5. Determining the residual flexibility only requires additional curve fitting during the stiffness calculation, requiring only an additional iteration of the fitting algorithm or process for equation (18) in some embodiments. The residual flexibility has the same form as the stiffness matrix (see equation (19) and the accompanying discussion).

Figure 3:
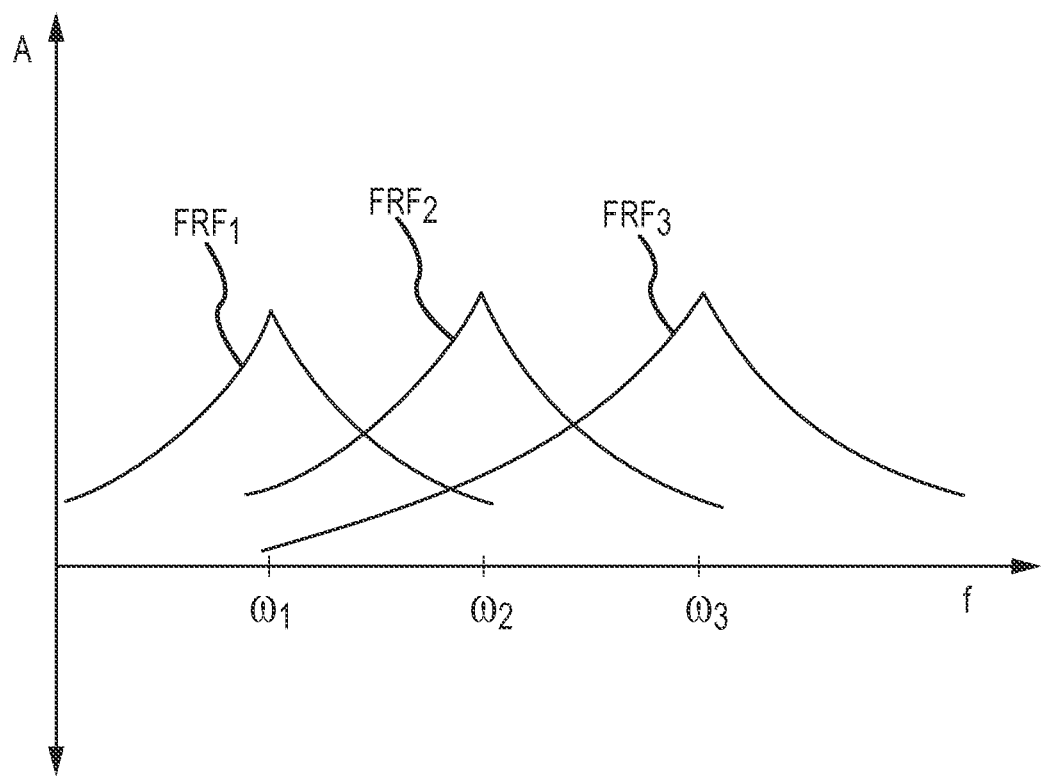
FIG. 3 is a graph of frequency response showing the effect of residual flexibility.

FIG. 3 is a graph of three FRFs showing the effect of residual flexibility, plotted as amplitude (A) versus frequency (f). The amplitude peak of $FRF_1$ occurs at the first resonance frequency $\omega_1$. The amplitude peaks $FRF_2$ and $FRF_3$ occur at the resonance frequencies $\omega_2$ and $\omega_3$. It can be seen from the graph that $FRF_2$ and $FRF_3$ have tails that affect the amplitude values of $FRF_1$, including at the resonance frequency $\omega_1$. This effect of the tails of $FRF_2$ and $FRF_3$ on the vibration at the resonance frequency $\omega_1$ is called residual flexibility. Similarly, $FRF_2$ shows the residual flexibility effect of the tail of $FRF_3$.

Referring again to FIG. 2, the meter residual flexibility value 218 may be generated in order to verify proper operation of the vibratory flowmeter 5. The meter residual flexibility value 218 may be generated for a verification process, wherein the meter residual flexibility value 218 serves the purpose of verifying proper and accurate operation of the vibratory flowmeter 5. When both the primary and secondary vibration modes are used, then a stiffness vector or matrix can be generated for each mode. Likewise, when both the primary and secondary vibration modes are used, then a residual flexibility vector or matrix can be generated for each mode.

The above development assumed that the four FRFs are measured simultaneously, ignoring the need to sustain the meter at resonance, a condition of normal flow measurement operation. The need to sustain resonance complicates the issue in that four independent FRFs cannot be simultaneously measured in order to solve the problem. Rather, when computing FRFs, the aggregate effect of both drivers on the output can be measured.

$$\breve{H}_{S_-} \equiv \frac{\dot{x}_{L_-} + \dot{x}_{R_-}}{f_L + f_R} \qquad (20)$$

In this equation, the $\dot{x}_{L_-}$ term refers to the velocity at the selected pickoff due to the force at the left driver 180L and the $\dot{x}_{R_-}$ term refers to the velocity at the selected pickoff due to the force at the right driver 180R. This quantity cannot be directly measured. Rather, only the sum of the two drivers' effects at the pickoffs is measured. However, this quantity will be used in the theoretical development that follows. The summed-effect FRF defined in equation (20) is insufficient to solve for the desired four residues. However, it can be solved with one more piece of information, the FRF between the driver forces.

$$H_f \equiv \frac{f_L}{f_R} \qquad (21)$$

To see how these two pieces of information are sufficient to solve the system model, the definition of the frequency response function for an arbitrary driver "D" is used to define:

$$\dot{x}_D = \breve{H}_D f_D \qquad (22)$$

Using linearity, the effects of equation (22) can be summed as applied to the left and right drivers.

$$\dot{x}_{L_-} + \dot{x}_{R_-} = \breve{H}_{L_-} f_L + \breve{H}_{R_-} f_R \qquad (23)$$

Both sides of equation (23) can be divided by any nonzero quantity. For example, equation (23) can be divided by the sum of the left and right driver forces, which are nonzero so long as the structure is being excited.

$$\frac{\dot{x}_{L_-} + \dot{x}_{R_-}}{f_L + f_R} = \breve{H}_{L_-}\left(\frac{f_L}{f_L + f_R}\right) + \breve{H}_{R_-}\left(\frac{f_R}{f_L + f_R}\right) \qquad (24)$$

The left-hand side of equation (24) can be directly measured. The right-hand side features the individual FRFs that relate to the pole and residues. The force ratios of equation (21) can be used to transform equation (24).

$$\frac{f_L}{f_L + f_R} = \frac{f_L/f_R}{f_L/f_R + f_R/f_R} = \frac{H_f}{H_f + 1} \equiv \gamma_L \qquad (25)$$

$$\frac{f_R}{f_L + f_R} = \frac{f_R/f_R}{f_L/f_R + f_R/f_R} = \frac{1}{H_f + 1} \equiv \gamma_R \qquad (26)$$

Note that the $\gamma_L$ and $\gamma_R$ terms are defined in the equations to follow. Intuitively, though, they are the fraction of the total force applied at a particular driver. If the two drivers are driven equally, the $\gamma_L$ and $\gamma_R$ values are both 0.5. If one driver is driven fully, they are 0 and 1. In general, the $\gamma_L$ and $\gamma_R$ terms can be complex numbers with a magnitude and phase relationship and are computed from measured force (or electrical driver current) FRFs.

Substituting equations (20), (25), and (26) into equation (24) yields:

$$\breve{H}_{S_-} = \frac{\dot{x}_{L_-} + \dot{x}_{R_-}}{f_L + f_R} = \gamma_L \breve{H}_{L_-} + \gamma_R \breve{H}_{R_-} \qquad (27)$$

The last step is to replace the system FRFs $\breve{H}_{L_-}$ and $\breve{H}_{R_-}$ with pole residue models and rearrange the terms.

$$\gamma_L R_{L_-} + \gamma_R R_{R_-} + \frac{\breve{H}_{S_-}}{j\omega}\lambda = \breve{H}_{S_-} \qquad (28)$$

The gamma values and summed-FRFs in equation (28) are derived from measured data and are both functions of frequency. This basic equation can be expanded over five tones that may be driven for meter verification and over the two pickoffs, giving a system with ten equations and five unknowns. For clarity this expansion is shown in equation (29). Once this system of equations has been used to solve for the system parameters ($R_{LL}$, $R_{LR}$, $R_{RL}$, $R_{RR}$, $\lambda$), extracting the stiffness vector or matrix is a trivial matter.

$$\begin{bmatrix} \gamma_L(\omega_1) & \gamma_L(\omega_{Dr}) & 0 & 0 & \frac{\breve{H}_{SL}(\omega_1)}{j\omega_1} \\ \gamma_L(\omega_2) & \gamma_R(\omega_2) & 0 & 0 & \frac{\breve{H}_{SL}(\omega_2)}{j\omega_2} \\ \gamma_L(\omega_2) & \gamma_R(\omega_3) & 0 & 0 & \frac{\breve{H}_{SL}(\omega_3)}{j\omega_3} \\ \gamma_L(\omega_4) & \gamma_R(\omega_4) & 0 & 0 & \frac{\breve{H}_{SL}(\omega_4)}{j\omega_4} \\ \gamma_L(\omega_{Dr}) & \gamma_R(\omega_{Dr}) & 0 & 0 & \frac{\breve{H}_{SL}(\omega_{Dr})}{j\omega_{Dr}} \\ 0 & 0 & \gamma_L(\omega_1) & \gamma_R(\omega_1) & \frac{\breve{H}_{SR}(\omega_1)}{j\omega_1} \\ 0 & 0 & \gamma_L(\omega_2) & \gamma_R(\omega_2) & \frac{\breve{H}_{SR}(\omega_2)}{j\omega_2} \\ 0 & 0 & \gamma_L(\omega_2) & \gamma_R(\omega_3) & \frac{\breve{H}_{SR}(\omega_3)}{j\omega_3} \\ 0 & 0 & \gamma_L(\omega_4) & \gamma_R(\omega_4) & \frac{\breve{H}_{SR}(\omega_4)}{j\omega_4} \\ 0 & 0 & \gamma_L(\omega_{Dr}) & \gamma_R(\omega_{Dr}) & \frac{\breve{H}_{SR}(\omega_{Dr})}{j\omega_{Dr}} \end{bmatrix} \qquad (29)$$

-continued $$\begin{Bmatrix} R_{LL} \\ R_{RL} \\ R_{LR} \\ R_{RR} \\ \lambda \end{Bmatrix} = \begin{bmatrix} \tilde{H}_{SL}*(\omega_1) \\ \tilde{H}_{SL}*(\omega_2) \\ \tilde{H}_{SL}*(\omega_3) \\ \tilde{H}_{SL}*(\omega_4) \\ \tilde{H}_{SL}*(\omega_{Dr}) \\ \tilde{H}_{SR}*(\omega_1) \\ \tilde{H}_{SR}*(\omega_2) \\ \tilde{H}_{SR}*(\omega_3) \\ \tilde{H}_{SR}*(\omega_4) \\ \tilde{H}_{SR}*(\omega_{Dr}) \end{bmatrix}$$

The pole-residue model can be modified to include a single residual flexibility term to account for the aggregate effect of the other modes. This effect is assumed to be constant with frequency within the local measurements near the drive mode. This will be true if all other modes are higher-frequency than the drive mode and are sufficiently far away to be treated as a pure stiffness. The modified pole-residue model is:

$$H(\omega) = \frac{R}{j\omega - \lambda} + \Phi \tag{30}$$

The model can be converted to a velocity FRF and the terms can be rearranged to obtain the more readily solvable form:

$$\tilde{H}(\omega) = \frac{j\omega R}{j\omega - \lambda} + j\omega \Phi \tag{31}$$

This model can be transformed into:

$$\tilde{H}_{S_-} = \gamma_L R_{L_-} + \gamma_L (j\omega - \lambda)\Phi_{L_-} + \gamma_R R_{R_-} + \gamma_R (j\omega - \lambda)\Phi_{R_-} + \frac{\tilde{H}_{S_-}}{j\omega}\lambda \tag{32}$$

The equation is no longer strictly linear in terms of the unknowns, R, λ, and Φ. Rather, the Φ and λ terms are interdependent. This can be handled via simple iterative solution technique. The model is first solved without residual flexibility terms (using equation (28)), then re-solved using the original estimate of the pole for the multipliers of Φ. This approach works reasonably well because the pole estimate is fairly insensitive to the relatively small residual flexibility, much more so than the residues are. Since a new pole estimate is produced each time equation (32) is evaluated, the iterative technique can be repeated until the pole stabilizes (although a single iteration may be sufficient in practice). In an online implementation, where system parameters are computed for a number of sequential measurements in time, it may be more useful or efficient to seed the estimate of the pole with the value from the previous time window, rather than starting from scratch with the model without residual flexibility each time.

For actual use, equation (32) can be expanded in the same way equation (28) was expanded into equation (29). With the addition of the residual flexibilities, which are also unique for each input/output pairing, there are now ten equations and nine unknowns. The system of equations is not nearly as overdetermined as it was in the original meter verification, but experimental data has shown the results to still be relatively stable. These equations can be expanded by the addition of a low frequency term accounting for the coil resistance.

In the development thus far, the γ quantities (derived from the left-right force FRFs and essentially the fraction of whole input force applied at a particular driver) have been treated as measured quantities. However, the distribution of input forces between the left and right drivers is a design parameter for the algorithm. The FRFs are still measured to detect any variation from what was commanded (e.g., due to back-EMF driving current back into the current amplifiers), but in an ideal world the γ quantities would be constants chosen for the procedure. The individual γ values can be viewed as components of a spatial force matrix Γ:

$$\Gamma = \begin{bmatrix} \gamma_L(\omega_1) & \gamma_L(\omega_2) & \gamma_L(\omega_3) & \gamma_L(\omega_4) & \gamma_L(\omega_{DR}) \\ \gamma_R(\omega_1) & \gamma_R(\omega_2) & \gamma_R(\omega_3) & \gamma_R(\omega_4) & \gamma_R(\omega_{DR}) \end{bmatrix} \tag{33}$$

Here rows correspond to different input locations and columns to different frequencies. The matrix can be reshaped to fit however many frequencies (or drivers) are in use. The choice of Γ is not entirely arbitrary. For instance, driving all tones equally on each driver will cause the matrix in equation (29) to be ill-conditioned for a least-squares solution (since columns 1 and 2 and 3 and 4 would be identical). Increasing the spatial separation of the tones results in better numerical behavior when solving, since columns of the matrix are more differentiated. In an effort to maximize this separation, the design parameters can comprise:

$$\Gamma = \begin{bmatrix} 1 & 0 & 1 & 0 & .5 \\ 0 & 1 & 0 & 1 & .5 \end{bmatrix} \tag{34}$$

Of course, the actual measured values will not be identically equal to the above values. The tones are each given entirely to a particular driver. The drive tone is evenly split between the drivers to help match the symmetric drive-tone mode shape and minimize the excitation of the residual flexibilities of other modes (twisting-type modes are not excited very well, though higher-frequency symmetric modes may be).

In one embodiment, the storage system 204 stores a baseline meter residual flexibility 220. In some embodiments, the baseline meter residual flexibility 220 may be programmed into the meter electronics 20 at the factory (or other manufacturer facility), such as upon construction or sale of the vibratory flowmeter 5. Alternatively, the baseline meter residual flexibility 220 may be programmed into the meter electronics 20 during a field calibration operation or other calibration or re-calibration operation. However, it should be understood that the baseline meter residual flexibility 220 in most embodiments will not be changeable by a user or operator or during field operation of the vibratory flowmeter 5.

In one embodiment, the storage system 204 stores a predetermined residual flexibility range 221. The predetermined residual flexibility range 221 comprises a selected range of acceptable residual flexibility values. The predetermined residual flexibility range 221 may be chosen to account for normal wear on the vibratory flowmeter 5. The predetermined residual flexibility range 221 may be chosen to account for corrosion or erosion in the vibratory flowmeter 5.

In some embodiments, the storage system 204 stores a verification routine 213. The verification routine 213, when executed by the processing system 203, can perform a verification process for the vibratory flowmeter 5. In some embodiments, the processing system 203 when executing the verification routine 213 is configured to generate a meter stiffness value. In some embodiments, the processing system 203 when executing the verification routine 213 is configured to generate a meter stiffness value and verify the proper operation of the vibratory flowmeter using the meter stiffness value. In some embodiments, the processing system 203 when executing the verification routine 213 is configured to generate a meter residual flexibility value. In some embodiments, the processing system 203 when executing the verification routine 213 is configured to generate a meter residual flexibility value and verify the proper operation of the vibratory flowmeter using the meter residual flexibility value.

In some embodiments, the processing system 203 when executing the verification routine 213 is configured to vibrate the flowmeter assembly 10 in a primary vibration mode using the first and second drivers 180L and 180R, determine first and second primary mode currents 230 of the first and second drivers 180L and 180R for the primary vibration mode and determining first and second primary mode response voltages 231 generated by the first and second pickoff sensors 170L and 170R for the primary vibration mode, generate a meter stiffness value 216 using the first and second primary mode currents 230 and the first and second primary mode response voltages 231, and verify proper operation of the vibratory flowmeter 5 using the meter stiffness value 216.

In some embodiments, the first and second primary mode currents 230 comprise commanded current levels. Alternatively, in other embodiments the first and second primary mode currents 230 comprise measured current levels.

In some embodiments, the second driver 180R is uncorrelated with the first driver 180L. Alternatively, in other embodiments the first and second drivers 180L and 180R are operated in a correlated manner.

In some embodiments, verifying proper operation of the vibratory flowmeter 5 comprises comparing the meter stiffness value 216 to a predetermined stiffness range 219, generating a verification indication for the vibratory flowmeter 5 if the meter stiffness value 216 falls within the predetermined stiffness range 219, and generating a verification failure indication for the vibratory flowmeter 5 if the meter stiffness value 216 does not fall within the predetermined stiffness range 219.

In some embodiments, the processing system 203 when executing the verification routine 213 is configured to vibrate the flowmeter assembly 10 in a secondary vibration mode using the first and second drivers 180L and 180R, determine first and second secondary mode currents 236 of the first and second drivers 180L and 180R for the secondary vibration mode and determining first and second secondary mode response voltages 237 of the first and second pickoff sensors 170L and 170R for the secondary vibration mode, and generate the meter stiffness value 216 using one or both of the first and second primary mode currents 230 and the first and second primary mode response voltages 231 or the first and second secondary mode currents 236 and the first and second secondary mode response voltages 237.

In some embodiments, the processing system 203 when executing the verification routine 213 is configured to generate a meter residual flexibility value 218 using the first and second primary mode currents 230 and the first and second primary mode response voltages 231.

In some embodiments, the processing system 203 when executing the verification routine 213 is configured to generate a meter residual flexibility value 218 using the first and second primary mode currents 230 and the first and second primary mode response voltages 231, compare the meter residual flexibility value 218 to a predetermined residual flexibility range 221, generate a verification indication for the vibratory flowmeter 5 if the meter residual flexibility value 218 falls within the predetermined residual flexibility range 221, and generate a verification indication for the vibratory flowmeter 5 if the meter residual flexibility value 218 does not fall within the predetermined residual flexibility range 221.

In some embodiments, the processing system 203 when executing the verification routine 213 is configured to vibrate the flowmeter assembly 10 in a secondary vibration mode using the first and second drivers 180L and 180R, determine first and second secondary mode currents 236 of the first and second drivers 180L and 180R for the secondary vibration mode and determining first and second secondary mode response voltages 237 of the first and second pickoff sensors 170L and 170R for the secondary vibration mode, and generate a meter residual flexibility value 218 using one or both of the first and second primary mode currents 230 and the first and second primary mode response voltages 231 or the first and second secondary mode currents 236 and the first and second secondary mode response voltages 237.

The verification operation is significant because it enables the meter electronics 20 to make a stiffness determination in the field, without performing an actual flow calibration test. It enables a stiffness determination without a calibration test stand or other special equipment or special fluids. This is desirable because performing a flow calibration in the field is expensive, difficult, and time-consuming.

Figure 4:
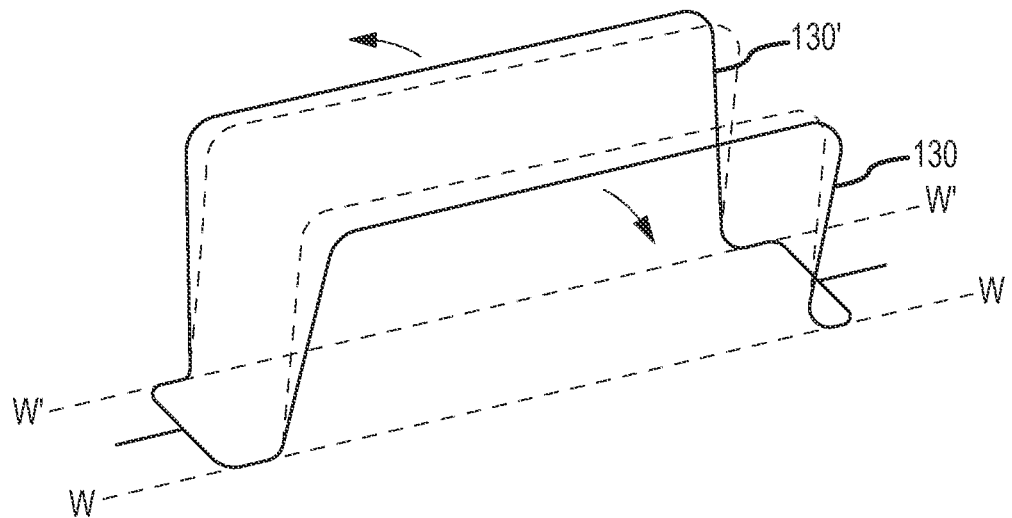
FIG. 4 represents a vibratory flowmeter having curved flowtubes wherein the two parallel curved flowtubes are vibrated in a bending mode.

FIG. 4 represents a vibratory flowmeter 5 having curved flowtubes 130 and 130' wherein the two parallel curved flowtubes 130 and 130' are vibrated in a bending mode. The dashed lines in the figure show the rest positions of the two flowtubes 130 and 130'. In the bending mode, the tubes are vibrated with respect to the bending axes W-W and W'-W'. Consequently, the flowtubes 130 and 130' move periodically away from each other (as shown by the curved arrows), then toward each other. It can be seen that each flowtube 130 and 130' moves as a whole with respect to the bending axes W-W and W'-W'.

Figure 5:
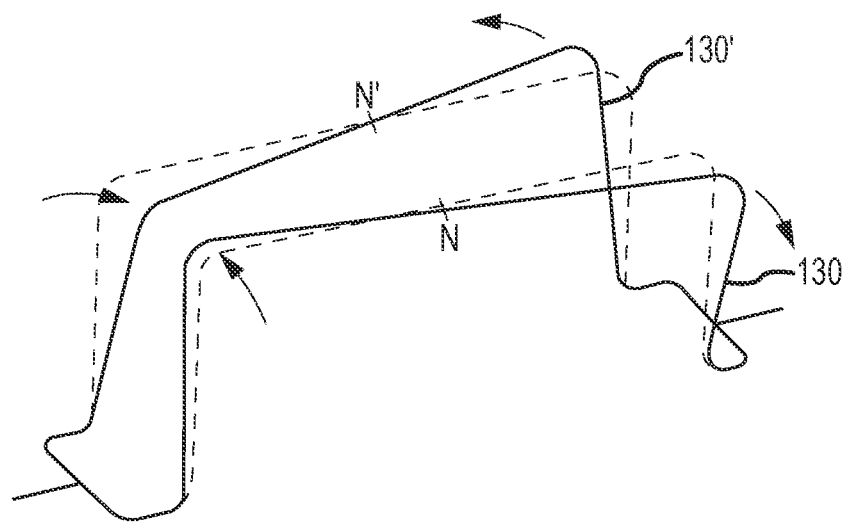
FIG. 5 represents the vibratory flowmeter wherein the two parallel curved flowtubes are vibrated in a twist (or Coriolis) mode.

FIG. 5 represents the vibratory flowmeter 5 wherein the two parallel curved flowtubes 130 and 130' are vibrated in a twist (or Coriolis) mode. The dashed lines in the figure show the rest positions of the two flowtubes 130 and 130'. In the twist mode, the flowtubes at the left end in the figure are being forced together, while at the right end in the figure the flowtubes are being forced apart (in a Coriolis mode vibration, the twist is induced by Coriolis forces in reaction to a driven vibration, but may be simulated or induced by using two or more drivers to force the twist vibration). As a result, each flowtube is being twisted about a center point or node, such as the nodes N and N'. Consequently, the ends of the flowtubes 130 and 130' (or upstream and downstream portions) periodically move toward and away from each other (as shown by the curved arrows).

Figure 6:
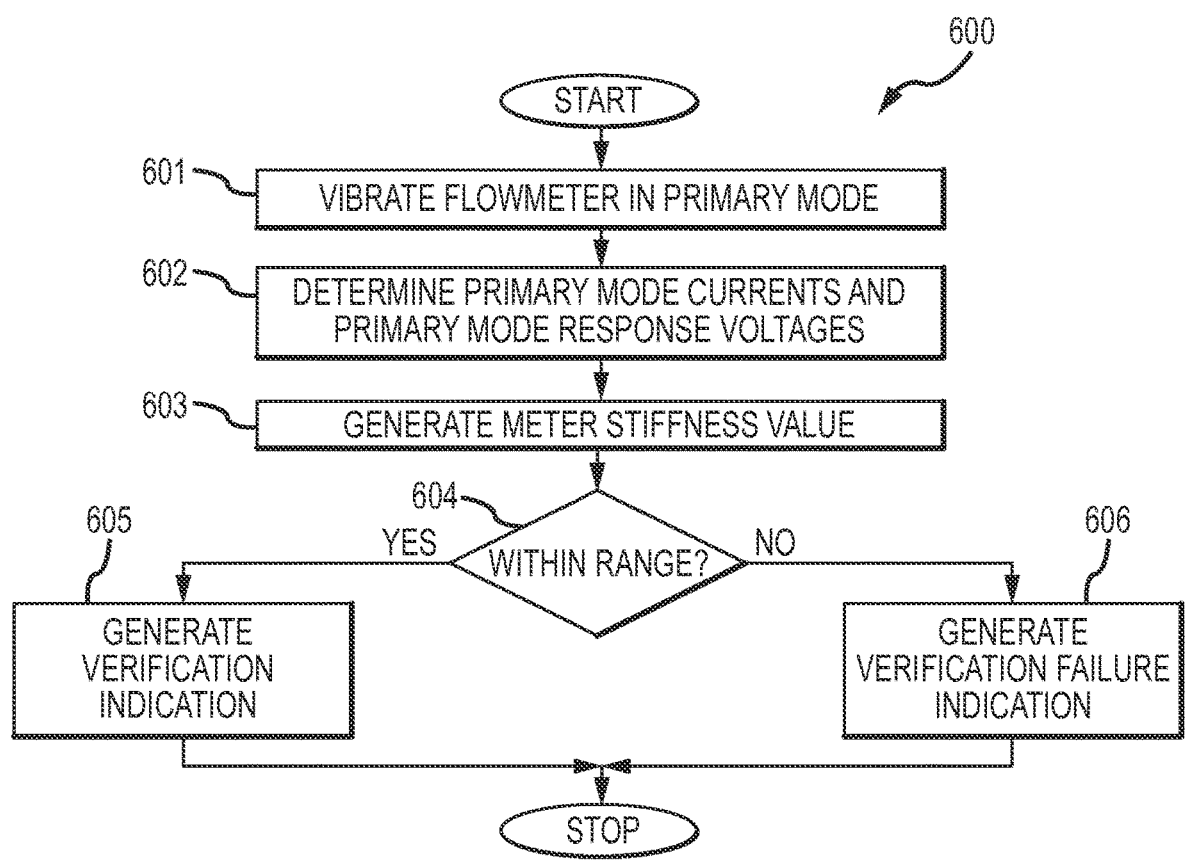
FIG. 6 is a flowchart of a meter verification method for a vibratory flowmeter according to an embodiment of the invention.

FIG. 6 is a flowchart 600 of a meter verification method for a vibratory flowmeter according to an embodiment of the invention. In step 601, the flowmeter assembly of the vibratory flowmeter is vibrated in a primary vibration mode to generate a primary mode vibrational response. The primary mode vibrational response comprises electrical signals generated by the first and second pickoff sensors 170L and 170R.

In some embodiments, the primary vibration mode may comprise a bending mode. However, it should be understood that the vibration could comprise other vibration modes, including a secondary vibration mode (see FIG. 8 and the accompanying text below). It should also be understood that vibrating the flowmeter assembly at the primary vibration mode may comprise vibrating in a predetermined vibration mode and substantially at a resonance frequency for the predetermined vibration mode.

In step 602, the first and second primary mode currents and the first and second primary mode response voltages are determined. The first and second primary mode currents are the electrical currents flowing through the two drivers. The first and second primary mode currents can comprise commanded values of the currents or can comprise measured current values for the two drivers.

The first and second primary mode response voltages are the response voltages generated by the first and second pickoff sensors. The first and second primary mode response voltages can comprise voltages generated with operating at or near a resonant frequency of the primary vibration mode.

In step 603, a meter stiffness value is generated. The meter stiffness value may be generated using the first and second primary mode currents and the first and second primary mode response voltages, as previously discussed.

In step 604, the newly-generated meter stiffness value is compared to the baseline meter stiffness. If the meter stiffness value is within the predetermined stiffness range, then the method branches to step 605. If the meter stiffness value is not within the predetermined stiffness range, then the method branches to step 606.

The comparison may comprise determining a difference between the meter stiffness value and the baseline meter stiffness, wherein the difference is compared to a predetermined stiffness range. The predetermined stiffness range may comprise a stiffness range that includes expected variations in measurement accuracy, for example. The predetermined stiffness range may delineate an amount of change in the meter stiffness that is expected and is not significant enough to generate a verification failure determination.

The predetermined stiffness range may be determined in any manner. In one embodiment, the predetermined stiffness range may comprise a predetermined tolerance range above and below the baseline meter stiffness. Alternatively, the predetermined stiffness range may be derived from a standard deviation or confidence level determination that generates upper and lower range boundaries from the baseline meter stiffness, or using other suitable processing techniques.

In step 605, a verification indication is generated since the difference between the meter stiffness value and the baseline meter stiffness fell within the predetermined stiffness range. The meter stiffness is therefore determined to not have changed significantly. No further action may need to be taken, although the result may be logged, reported, et cetera. The indication may include an indication to the user that the baseline meter stiffness is still valid. The successful verification indication signifies that the baseline meter stiffness is still accurate and useful and that the vibratory flowmeter is still operating accurately and reliably.

In step 606, a verification failure indication is generated since the difference between the meter stiffness value and the baseline meter stiffness has exceeded the predetermined stiffness range. The stiffness of the meter is therefore determined to have changed significantly. As part of the verification failure indication, a software flag, visual indicator, message, alarm, or other indication may be generated in order to alert the user that the flowmeter may not be acceptably accurate and reliable. In addition, the result may be logged, reported, et cetera.

Figure 7:
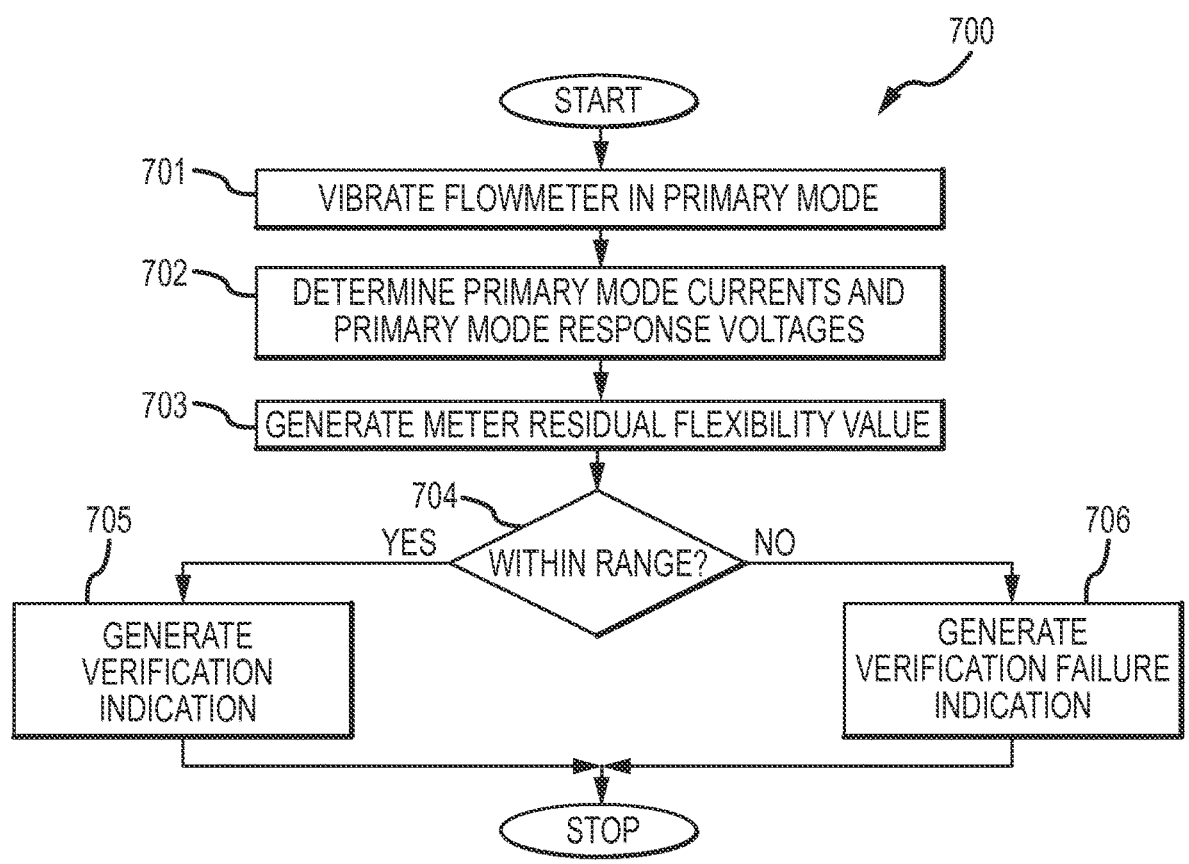
FIG. 7 is a flowchart of a meter verification method for a vibratory flowmeter according to an embodiment of the invention.

FIG. 7 is a flowchart 700 of a meter verification method for a vibratory flowmeter according to an embodiment of the invention. In step 701, the flowmeter assembly of the vibratory flowmeter is vibrated in a primary vibration mode to generate a primary mode vibrational response, as previously discussed.

In step 702, the first and second primary mode currents and the first and second primary mode response voltages are determined, as previously discussed.

In step 703, a meter residual flexibility value is generated. The meter residual flexibility value may be generated using the first and second primary mode currents and the first and second primary mode response voltages, as previously discussed.

In step 704, the newly-generated meter residual flexibility value is compared to a baseline meter residual flexibility. If the meter residual flexibility value is within the predetermined residual flexibility range, then the method branches to step 705. If the meter residual flexibility value is not within the predetermined residual flexibility range, then the method branches to step 706.

The comparison may comprise determining a difference between the meter residual flexibility value and the baseline meter residual flexibility, wherein the difference is compared to the predetermined residual flexibility range. The predetermined residual flexibility range may comprise a residual flexibility range that includes expected variations in measurement accuracy, for example. The predetermined residual flexibility range may delineate an amount of change in the meter residual flexibility that is expected and is not significant enough to generate a verification failure determination.

The predetermined residual flexibility range may be determined in any manner. In one embodiment, the predetermined residual flexibility range may comprise a predetermined tolerance above and below the baseline meter residual flexibility. Alternatively, the predetermined residual flexibility range may be derived from a standard deviation or confidence level determination that generates upper and lower range boundaries from the baseline meter residual flexibility, or using other suitable processing techniques.

In step 705, a verification indication is generated since the difference between the meter residual flexibility value and the baseline meter residual flexibility fell within the predetermined residual flexibility range. The meter residual flexibility is therefore determined to not have changed significantly. No further action may need to be taken, although the result may be logged, reported, et cetera. The indication may include an indication to the user that the baseline meter residual flexibility is still valid. The successful verification indication signifies that the baseline meter residual flexibility is still accurate and useful and that the vibratory flowmeter is still operating accurately and reliably.

In step 706, a verification failure indication is generated since the difference between the meter residual flexibility value and the baseline meter residual flexibility has exceeded the predetermined residual flexibility range. The residual flexibility of the meter is therefore determined to have changed significantly. As part of the verification failure indication, a software flag, visual indicator, message, alarm, or other indication may be generated in order to alert the user that the flowmeter may not be acceptably accurate and reliable. In addition, the result may be logged, reported, et cetera.

Figure 8:
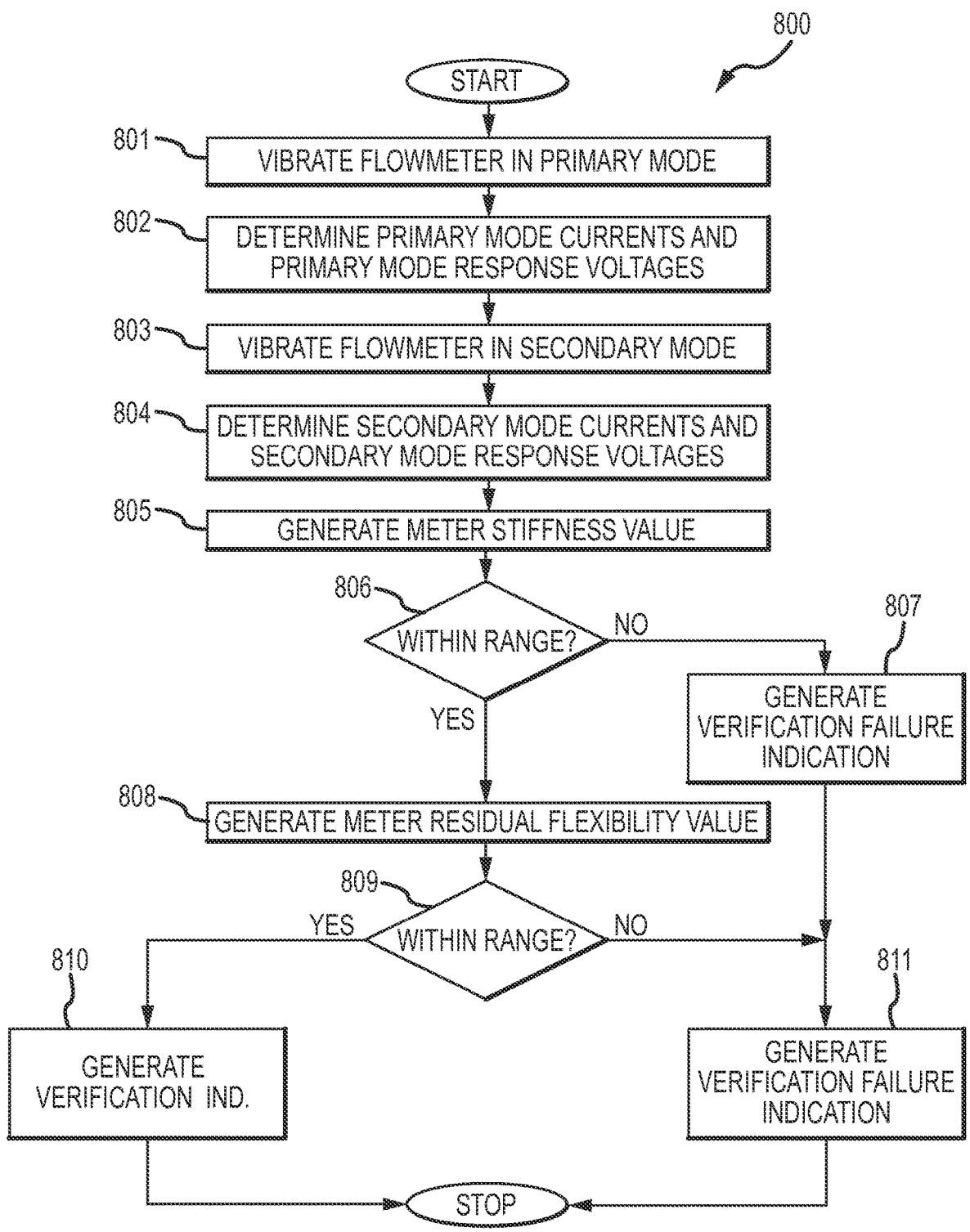
FIG. 8 is a flowchart of a meter verification method for a vibratory flowmeter according to an embodiment of the invention.

FIG. 8 is a flowchart 800 of a meter verification method for a vibratory flowmeter according to an embodiment of the invention. In step 801, the flowmeter assembly of the vibratory flowmeter is vibrated in a primary vibration mode to generate a primary mode vibrational response, as previously discussed.

In step 802, the first and second primary mode currents and the first and second primary mode response voltages are determined, as previously discussed.

In step 803, the flowmeter assembly is vibrated in a secondary vibration mode to generate a secondary mode vibrational response. In some embodiments, the secondary mode vibrational response is generated simultaneously with the primary mode vibrational response. Alternatively, the secondary vibration mode may be alternated with the primary vibration mode.

In some embodiments, the primary vibration mode may comprise a bending mode and the secondary vibration mode may comprise a twist mode. However, it should be understood that the vibration could comprise other vibration modes.

In step 804, first and second secondary mode drive currents and first and second secondary mode response voltages are determined.

In step 805, a meter stiffness value is generated, as previously discussed. The meter stiffness value may be generated using the first and second primary mode currents and the first and second primary mode response voltages. The meter stiffness value may be generated using the first and second secondary mode currents and the first and second secondary mode response voltages. The meter stiffness value may be generated using both the first and second primary mode currents and the first and second primary mode response voltages and the first and second secondary mode currents and the first and second secondary mode response voltages.

In step 806, the newly-generated meter stiffness value is compared to the baseline meter stiffness. If the meter stiffness value is within the predetermined stiffness range, then the method proceeds to step 808. If the meter stiffness value is not within the predetermined stiffness range, then the method branches to step 811, wherein a verification failure indication is generated.

In step 808, a meter residual flexibility value is generated, as previously discussed. The meter residual flexibility value may be generated using the first and second primary mode currents and the first and second primary mode response voltages. The meter residual flexibility value may be generated using the first and second secondary mode currents and the first and second secondary mode response voltages. The meter residual flexibility value may be generated using both the first and second primary mode currents and the first and second primary mode response voltages and the first and second secondary mode currents and the first and second secondary mode response voltages.

When both the primary and secondary vibration modes are used, then a stiffness vector or matrix can be generated for each mode. Likewise, when both the primary and secondary vibration modes are used, then a residual flexibility vector or matrix can be generated for each mode.

In step 809, the newly-generated meter residual flexibility value is compared to a baseline meter residual flexibility. If the meter residual flexibility value is within the predetermined residual flexibility range, then the method branches to step 810. If the meter residual flexibility value is not within the predetermined residual flexibility range, then the method branches to step 811.

In step 810, a verification indication is generated since the difference between the meter stiffness value and the baseline meter stiffness fell within the predetermined stiffness range and the difference between the meter residual flexibility value and the baseline meter residual flexibility fell within the predetermined residual flexibility range. Therefore, it can be determined that both the baseline meter stiffness and the baseline meter residual flexibility have not changed significantly. No further action may need to be taken, although the result may be logged, reported, et cetera. The indication may include an indication to the user that the baseline meter stiffness and the baseline meter residual flexibility are still valid. The successful verification indication signifies that the baseline meter stiffness and the baseline meter residual flexibility are still accurate and useful and that the vibratory flowmeter is still operating accurately and reliably.

In step 811, a verification failure indication is generated since either the difference between the meter stiffness value and the baseline meter stiffness has exceeded the predetermined stiffness range, the difference between the meter residual flexibility value and the baseline meter residual flexibility has exceeded the predetermined residual flexibility range, or both. One or both of the meter stiffness or the meter residual flexibility have changed significantly. As part of the verification failure indication, a software flag, visual indicator, message, alarm, or other indication may be generated in order to alert the user that the flowmeter may not be acceptably accurate and reliable. In addition, the result may be logged, reported, et cetera.

The vibratory flowmeter and method according to any of the embodiments can be employed to provide several advantages, if desired. The vibratory flowmeter and method according to any of the embodiments quantifies the flowmeter stiffness using one or more vibration modes to generate an improved and more reliable meter stiffness value. The vibratory flowmeter and method according to any of the embodiments quantifies the flowmeter residual flexibility using one or more vibration modes to generate an improved and more reliable meter stiffness value. The meter stiffness analysis method may determine if the vibratory flowmeter is still accurate and reliable.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A vibratory flowmeter (5) for meter verification, the vibratory flowmeter (5) comprising:
a flowmeter assembly (10) including one or more flowtubes (130, 130') and first and second pickoff sensors (170L, 170R);
first and second drivers (180L, 180R) configured to vibrate the one or more flowtubes (130, 130'); and
meter electronics (20) coupled to the first and second pickoff sensors (170L, 170R) and coupled to the first and second drivers (180L, 180R), with the meter electronics (20) being configured to vibrate the flowmeter assembly (10) in a primary vibration mode using the first and second drivers (180L, 180R), determine first and second primary mode currents (230) of the first and second drivers (180L, 180R) for the primary vibration mode, determine first and second primary mode response voltages (231) generated by the first and second pickoff sensors (170L, 170R) for the primary vibration mode, and generate a meter stiffness value (216) using the first and second primary mode currents (230) and the first and second primary mode response voltages (231), the meter stiffness value being a 2×2 matrix including a cross stiffness term $K_{LR}$ and a cross stiffness term $K_{RL}$, wherein the primary vibration mode is a natural vibration mode of the one or more flow tubes.

2. The vibratory flowmeter (5) of claim 1, with the first and second primary mode currents (230) comprising commanded current levels.

3. The vibratory flowmeter (5) of claim 1, with the first and second primary mode currents (230) comprising measured current levels.

4. The vibratory flowmeter (5) of claim 1, wherein the second driver (180R) is uncorrelated with the first driver (180L).

5. The vibratory flowmeter (5) of claim 1, with the meter electronics (20) being further configured to compare the meter stiffness value (216) to a predetermined stiffness range (219), generate a verification indication for the vibratory flowmeter (5) if the meter stiffness value (216) falls within the predetermined stiffness range (219), and generate a verification failure indication for the vibratory flowmeter (5) if the meter stiffness value (216) does not fall within the predetermined stiffness range (219).

6. The vibratory flowmeter (5) of claim 1, with the meter electronics (20) being further configured to vibrate the flowmeter assembly (10) in a secondary vibration mode using the first and second drivers (180L, 180R), determine first and second secondary mode currents (236) of the first and second drivers (180L, 180R) for the secondary vibration mode and determine first and second secondary mode response voltages (237) of the first and second pickoff sensors (170L, 170R) for the secondary vibration mode, and generate the meter stiffness value (216) using one or both of the first and second primary mode currents (230) and the first and second primary mode response voltages (231) or the first and second secondary mode currents (236) and the first and second secondary mode response voltages (237).

7. The vibratory flowmeter (5) of claim 1, with the meter electronics (20) being further configured to generate a meter residual flexibility value (218) using the first and second primary mode currents (230) and the first and second primary mode response voltages (231).

8. The vibratory flowmeter (5) of claim 1, with the meter electronics (20) being further configured to generate a meter residual flexibility value (218) using the first and second primary mode currents (230) and the first and second primary mode response voltages (231), compare the meter residual flexibility value (218) to a predetermined residual flexibility range (221), generate a verification indication for the vibratory flowmeter (5) if the meter residual flexibility value (218) falls within the predetermined residual flexibility range (221), and generate a verification failure indication for the vibratory flowmeter (5) if the meter residual flexibility value (218) does not fall within the predetermined residual flexibility range (221).

9. The vibratory flowmeter (5) of claim 1, with the meter electronics (20) being further configured to vibrate the flowmeter assembly (10) in a secondary vibration mode using the first and second drivers (180L, 180R), determine first and second secondary mode currents (236) of the first and second drivers (180L, 180R) for the secondary vibration mode and determining first and second secondary mode response voltages (237) of the first and second pickoff sensors (170L, 170R) for the secondary vibration mode, and generate a meter residual flexibility value (218) using one or both of the first and second primary mode currents (230) and the first and second primary mode response voltages (231) or the first and second secondary mode currents (236) and the first and second secondary mode response voltages (237).

* * * * *

UNITED STATES PATENT AND TRADEMARK OFFICE
CERTIFICATE OF CORRECTION

| | | |
|---|---|---|
| PATENT NO. | : 10,612,954 B2 | Page 1 of 1 |
| APPLICATION NO. | : 14/890668 | |
| DATED | : April 7, 2020 | |
| INVENTOR(S) | : Matthew Joseph Rensing, Christopher George Larsen and Timothy J. Cunningham | |

It is certified that error appears in the above-identified patent and that said Letters Patent is hereby corrected as shown below:

In the Specification

Column 13, Line 44, formula (23) should appear as follows:

$$\dot{x}_{L\_} + \dot{x}_{R\_} = \breve{H}_{L\_} f_L + \breve{H}_{R\_} f_R$$

Column 14, Lines 40 to 65, through Column 15, Lines 1 to 19, formula (29) should appear as follows:

$$\begin{bmatrix} \gamma_L(\omega_1) & \gamma_R(\omega_1) & 0 & 0 & \frac{\breve{H}_{SL}(\omega_1)}{j\omega_1} \\ \gamma_L(\omega_2) & \gamma_R(\omega_2) & 0 & 0 & \frac{\breve{H}_{SL}(\omega_2)}{j\omega_2} \\ \gamma_L(\omega_3) & \gamma_R(\omega_3) & 0 & 0 & \frac{\breve{H}_{SL}(\omega_3)}{j\omega_3} \\ \gamma_L(\omega_4) & \gamma_R(\omega_4) & 0 & 0 & \frac{\breve{H}_{SL}(\omega_4)}{j\omega_4} \\ \gamma_L(\omega_{Dr}) & \gamma_R(\omega_{Dr}) & 0 & 0 & \frac{\breve{H}_{SL}(\omega_{Dr})}{j\omega_{Dr}} \\ 0 & 0 & \gamma_L(\omega_1) & \gamma_R(\omega_1) & \frac{\breve{H}_{SR}(\omega_1)}{j\omega_1} \\ 0 & 0 & \gamma_L(\omega_2) & \gamma_R(\omega_2) & \frac{\breve{H}_{SR}(\omega_2)}{j\omega_2} \\ 0 & 0 & \gamma_L(\omega_3) & \gamma_R(\omega_3) & \frac{\breve{H}_{SR}(\omega_3)}{j\omega_3} \\ 0 & 0 & \gamma_L(\omega_4) & \gamma_R(\omega_4) & \frac{\breve{H}_{SR}(\omega_4)}{j\omega_4} \\ 0 & 0 & \gamma_L(\omega_{Dr}) & \gamma_R(\omega_{Dr}) & \frac{\breve{H}_{SR}(\omega_{Dr})}{j\omega_{Dr}} \end{bmatrix} \begin{Bmatrix} R_{LL} \\ R_{RL} \\ R_{LR} \\ R_{RR} \\ \lambda \end{Bmatrix} = \begin{bmatrix} \breve{H}_{SL}(\omega_1) \\ \breve{H}_{SL}(\omega_2) \\ \breve{H}_{SL}(\omega_3) \\ \breve{H}_{SL}(\omega_4) \\ \breve{H}_{SL}(\omega_{Dr}) \\ \breve{H}_{SR}(\omega_1) \\ \breve{H}_{SR}(\omega_2) \\ \breve{H}_{SR}(\omega_3) \\ \breve{H}_{SR}(\omega_4) \\ \breve{H}_{SR}(\omega_{Dr}) \end{bmatrix} \quad (29)$$

Signed and Sealed this
Twentieth Day of October, 2020

Andrei Iancu
*Director of the United States Patent and Trademark Office*